INVENTOR.
JAMES T. GATES
BY Meyer, Baldwin, Doran & Egan
ATTORNEYS

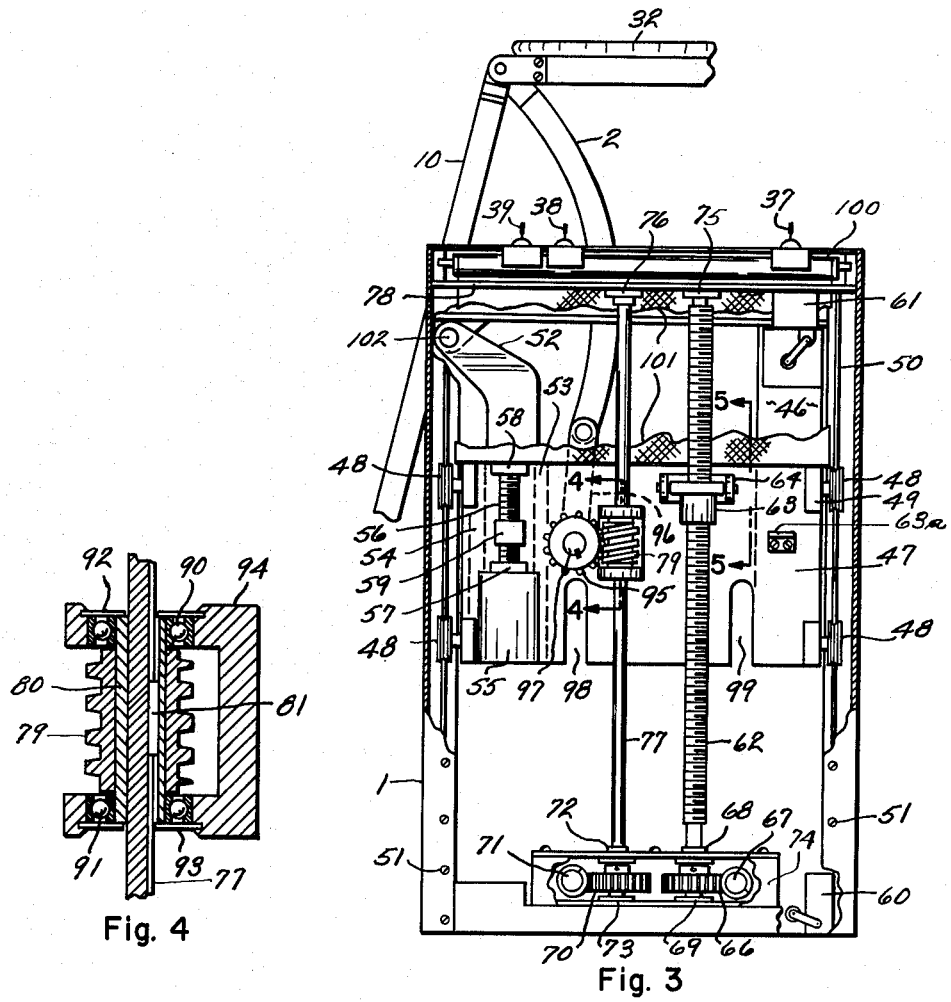

July 19, 1966  J. T. GATES  3,261,031
PATIENT HANDLER

Filed June 17, 1964  7 Sheets-Sheet 4

INVENTOR.
JAMES T. GATES
BY
Meyer, Baldwin, Doran & Egan
ATTORNEYS

July 19, 1966  J. T. GATES  3,261,031
PATIENT HANDLER
Filed June 17, 1964  7 Sheets-Sheet 5

INVENTOR.
JAMES T. GATES
BY
Meyer, Baldwin, Doran & Egan
ATTORNEYS

INVENTOR.
JAMES T. GATES
ATTORNEYS

INVENTOR.
JAMES T. GATES
BY
Meyer, Baldwin, Doran & Egan
ATTORNEYS 3,261,031
PATIENT HANDLER
James T. Gates, 1611 Kirkley Road, Columbus, Ohio
Filed June 17, 1964, Ser. No. 375,899
12 Claims. (Cl. 5—86)

This invention relates to a multiple purpose patient handler, combining into a single device means of positioning patients automatically who are unable to, or should not, exert effort because of their physical or mental condition.

More specifically, the device in a litter or prone position will rise to a height above a regular hospital bed. The litter, being suspended cantilever-style from one side, permits the prone positioner to be moved over top of a regular hospital bed and lowered into contact with the top surface of the bed. The wheels are small enough to go underneath the hospital bed. In this position the patient can be safely rolled from his side or slid onto the litter. The patient handler will again lift above the surface of the hospital bed and can then be moved away from the bed to the desired location.

Another objective of the invention is to lower the litter from the aforegoing described position to a low litter position.

A further objective of the patient handler is to automatically rotate the litter such that the patient can be stood upright into a vertical position without bending his body or exering personal movement of any degree.

A further objective is to oscillate the litter position to an angular plane or Trendelenberg position such that the patient's head is lower than the rest of his prone body. One-half of the oscillating cycle would bring the litter into a horizontal level plane.

A further objective is to provide self-contained, variable speed, rechargeable battery power.

A further objective is to be able to lock, or unlock, the rear hinge of the three plane sections making up the body of the patient handler so that in the unlocked condition of the rear hinge the handler will collapse from a litter and fold automatically by a motor driven linkage into a chair configuration.

A further feature is to provide a single front cantilevered pivot arm for the three sectional hinged main body portion of the patient handler. This pivot is to run parallel to the hinge connection and approximately 1 inch back of the front hinged leg support section attached to the seat. This arrangement permits the rigid litter to be rotated into a vertical position.

A further objective is to be able to lift the above mentioned cantilevered pivot arm independently and vertically a distance of approximately 4 inches such that the seat can be tilted back at a declining angle to make a more comfortable sitting position and to provide oscillation when in the litter position.

A further objective is to provide a rear stationary cantilevered bar support such that the back portion of the center member of the hinged three sectional main body will merely rest on the cantilevered bar for support.

A further important feature of the invention is to provide raising and lowering movements of a vertical attitude plate onto which the two cantilevered support arms are mounted, as well as a crank arm which transfers the main patient handler body members into alternating chair and litter positions. The advantage of this arrangement is to provide crank lever positioner movement at any height at which the device is raised.

A safety feature is to provide linear mounted electrical tape contact switches between all closing members, so that in the event a patient should get one of his limbs, or part of his body, in the way of two converging components of the patient handler, compression of the tape switch will open normally closed relay contact to stop any further movement. The electrical circuit continues to function only if the patient's pressure contact with the tape switch is removed.

Another feature of the invention is to provide a handled toilet seat which can be removed from the front top section of the chair seat portion of the patient handler.

Still another feature is to have the back center portion of the base cut out, which is desirable, allowing independent support of the rear wheels and to also provide clearance such that in the chair position the handler can be backed over a wall-hung-type commode.

Another feature of the invention is to provide synchro-mesh rear wheel locks operated by a single accessible hand lever.

A further objective is to provide right and left independent and manually operated leg lifts on the forward member of the three sectional hinged main body portion of the patient handler, such that a patient's legs can be propped up at various desired angles.

A further objective is to provide an adjustable foot rest which is also detachable and adjustable and in addition detachable arm rests for use with the patient handler when the rigid litter is being rotated into an upright vertical position.

Other and more specific details of the preferred form of the invention will be described in connection with the accompanying drawings, wherein:

FIG. 3 is a sectional view, enlarged, taken on line 3—3 of FIG. 2, showing the principal positioning mechanisms as well as the motor driven front pivot arm vertical adjustment mechanism;

FIG. 4 is a sectional view, enlarged, taken on line 4—4 of FIG. 3, showing the ball bearing mounted crank positioner worm with vertical splined shaft drive rod;

FIG. 5 is a fragmental perspective enlarged and partly exploded view of the "floating" lead screw nut, seen near the center of FIG. 3;

FIG. 20 is a side elevational view of the patient handler backed over a wall-hung-type commode; while

It can be seen from the foregoing drawings that the patient handler is capable of being adjusted by any one of three motor drives and by manual leg support adjustment into many needed positions of some incapacitated hospital patients.

Figures 1A, 1B, 1C:
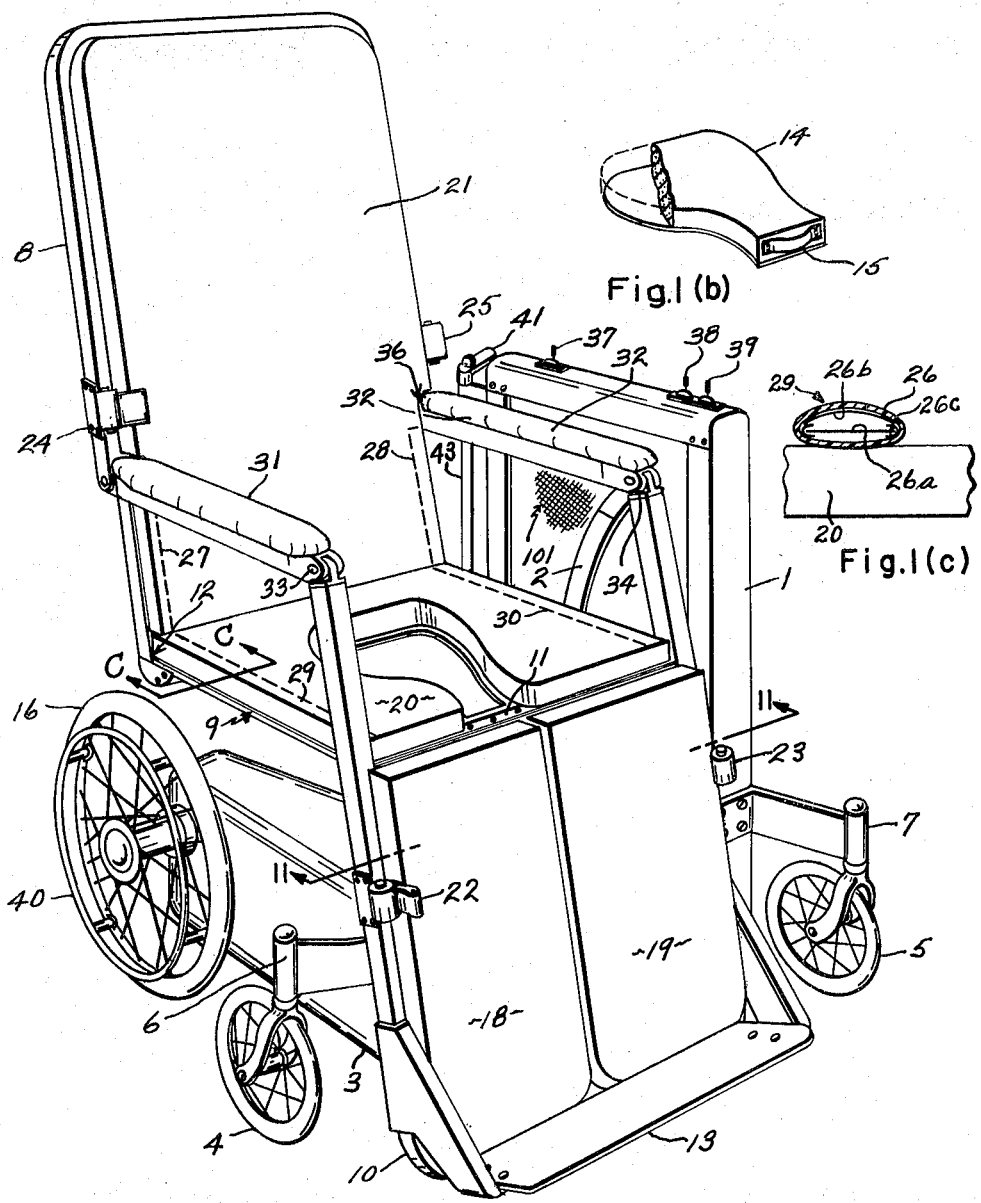
FIG. 1(a) is a front perspective view of the patient handler showing the device in its chair sitting position with seat portion, FIG. 1(b) removed; and a cross section enlarged, of the safety tape switch FIG. 1(c) taken along line C—C in FIG. 1(a) and indicated in FIG. 1(a) in its full length by dotted lines on each side of the chair.
Figure 10:
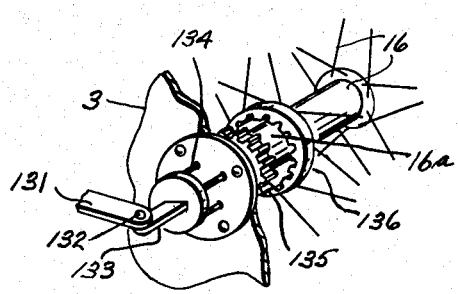
FIG. 10 is a fragmental perspective view, enlarged, taken on line 10—10 of FIG. 9 with parts broken away showing the synchro-mesh wheel lock engaging mechanism more in detail.

Referring now more in detail to the drawings, it is seen in FIG. 1 and 1 is a frame containing the lift mechanism 62, 63, 64, 47; and crank arm and link mechanisms 96, 2. The frame 1 is bolted securely and normal to the base 3. The two front pivot wheels, 4 and 5, on caster arms, are socketed in bearing pivot arms 6 and 7 respectively. Pivot arm 6 is secured to base 3 and arm 7 is secured to lift frame 1. The back 8, seat member 9 and leg section 10, make up the three principal hinged sections of the patient handler body and will be referred to as such. Hinges 11 and 12 (beneath padding) in FIG. 1 link the three sections into varying angular position from chair to litter. Parts 31 or 32, 8, 9 and 10 (upper part) are hingedly connected at 11, 12, 33 and 35 to provide a parallelogram or parallel ruler arrangement whereby 31 and 32 are always parallel to 9, and 8 is always parallel to 10, unless locked in line with 10. Foot rest 13 is adjustable for different leg lengths, or it may be removed from the chair, as desired. Removable chair seat portion 14, FIG. 1(b), has a handle 15 and may be removed from the top and front of the chair when used as a toilet seat as in FIG. 20. Rear wheels 16 and 17 are attached to base 3 by stub bearing shafts seen more clearly at 16a in FIG. 10.

Leg cushions 18 and 19 are independent, as well as seat cushion 20 and back cushion 21, all being affixed to the folding sections 8, 9 and 10 by snaps, not shown. Roll-up-type safety belts 22, 23, 24 and 25 pull out and buckle together to secure the patient as needed.

A commercially available "tape-switch" 26, shown in cross section at FIG. 1(c) is attached to the padding of the back along the dotted lines 27 and 28. These lines indicate the tape-switch locations, the actual structure being shown in FIG. 1(c). Two other sets of identical tape switches are secured on the padding of the seat along dotted lines 29 and 30. The tape switches 26 in these four locations are connected electrically to operate a relay which discontinues the electrical operating circuit of motor 113, see FIG. 21, when the tape switch is depressed at any point to close its two normally open circuits between 26a and 26b. As crank arm 96 and link 2 operate downwardly in FIG. 6 to pull the leg section 10 into a horizontal position, arms 31 and 32 acting as links, being hinged at 33 and 34 in the front and 35 and 36 at the back, are caused to lower into a horizontal position adjacent the seat section 9. Link 2 is pivotally connected at 34. An obstruction, such as part of the patient's body, being inserted accidentally, or otherwise, between the converging members will depress the tape switch 26 and electrical operation of the patient handler will discontinue until the obstruction is removed.

Figure 17:
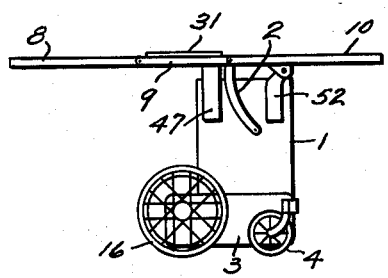
FIG. 17 is a side elevational view of the elevated litter position.

Referring to FIG. 1, switch 37 is shown vertical, or in the "off" position. Backward movement of the switch 37 completes an electrical circuit (not shown) to operate a 1/10 horsepower electric motor 113 which operates a crank arm 96 to pull linkage 2 downward closing the two side parallelograms of openings made by members 8, 9, 10 and the two padded arm members 31 and 32 making a litter of the assembly as seen in FIG. 17. Pushing switch 37 forward brings linkage 2 upward to effect a chair, as shown in FIG. 1. Switch 38 pushes forward controls motor 112 to effectively lift the three-section patient handler, as will be explained. A backward movement of switch 38 will cause motor 112 to move in the opposite direction and thus lower the three-section device. Switch 39 pushed forward controls motor 55 to lift the front of the chair seat, tilting the center section 9 back at a selected angle with hinge 12 lower than hinge 11 or approximately 15° maximum. A backward deflection of switch 39 controls motor 55 to move in the opposite direction which brings the center seat section to a level horizontal position, or lowers hinge 11 to a level below hinge 12. Hand propelling wheel rims, such as 40, may be either included as part of the rear wheels or omitted.

Also, in FIG. 1 is shown the synchromesh brake actuator handle 41 attached to housing 1 by bearing bracket 42. A 45° clockwise turn of handle 41 rotates brake rod 43 to engage the rear wheel brakes, explained later in connection with FIG. 9.

Figure 2:
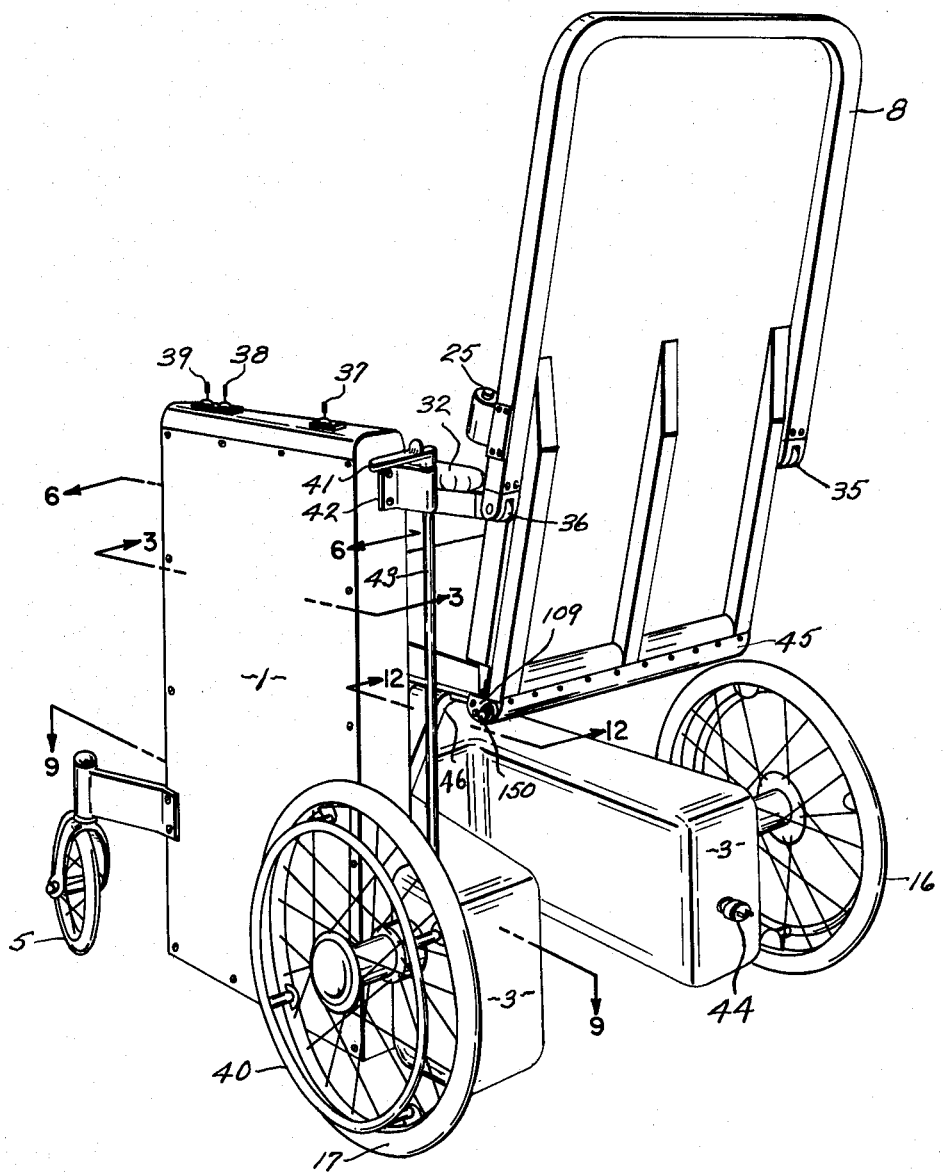
FIG. 2 is a rear perspective view of the patient handler in its chair position.
Figure 7:
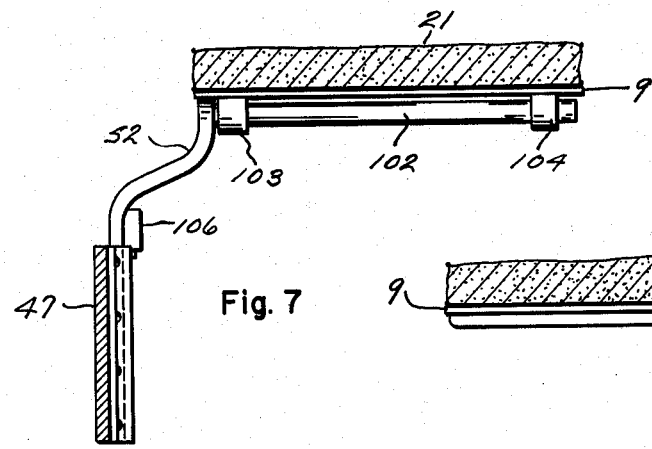
FIG. 7 is a sectional view taken on line 7—7 of FIG. 6 showing a rear view of the front cantilevered pivot arm adjustable for height.
Figure 9:
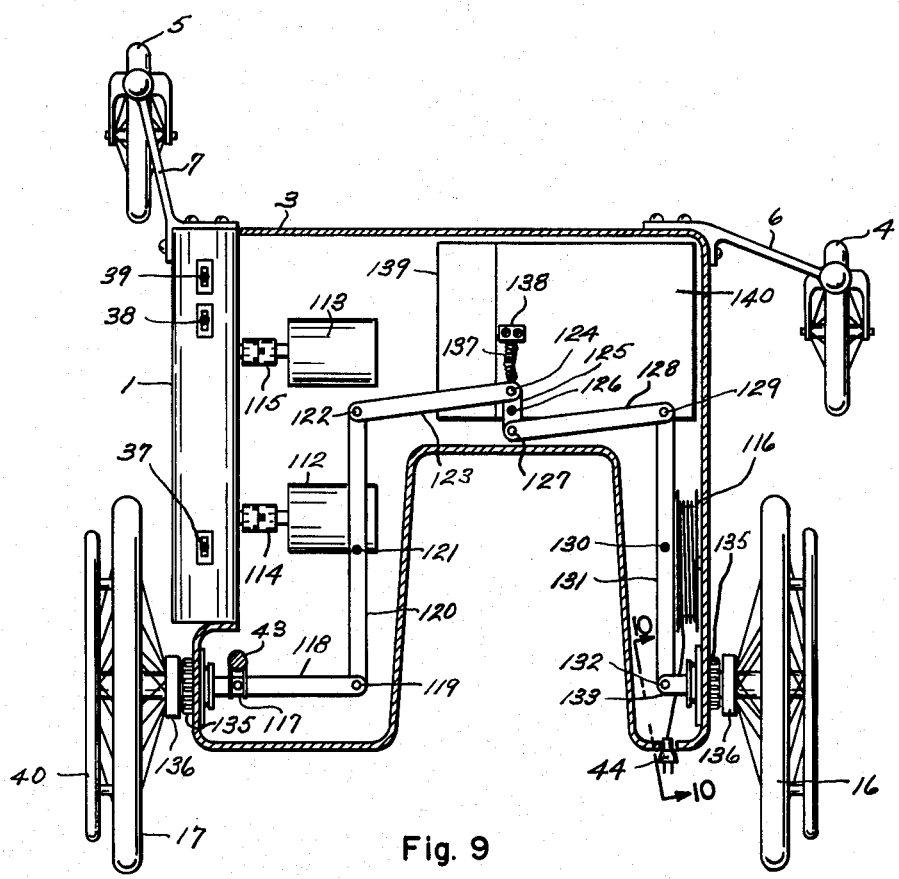
FIG. 9 is a sectional view, enlarged, taken on line 9—9 of FIG. 2 showing the base-mounted drive motors and rear wheel lock or brake mechanism.

FIG. 2 shows clearly the base 3 carrying the rear wheels 16 and 17, and rigidly mounting the lift mechanism housing 1. Electrical outlet plug 44 is attached to an automatic wind up reel, thence to a battery charger, as shown in FIG. 9. Sheet metal guard 45 protects the litter hinge stop and adds a safety guard preventing pinched fingers. The stationary rear cantilever support arm 46 is barely visible in FIG. 2.

Figure 8:
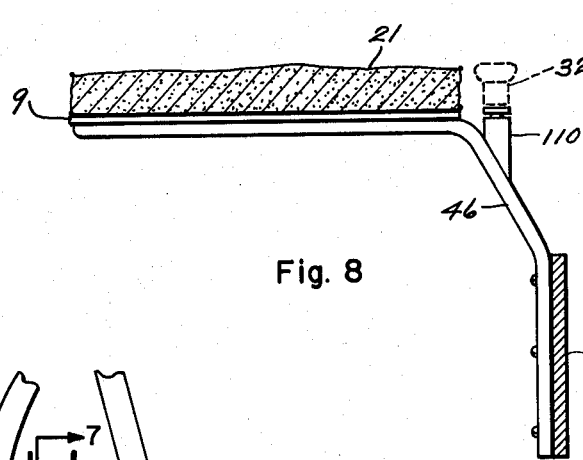
FIG. 8 is a sectional view taken on line 8—8 of FIG. 6 showing a front elevational view of the stationary rear cantilevered support arm.
Figure 6:
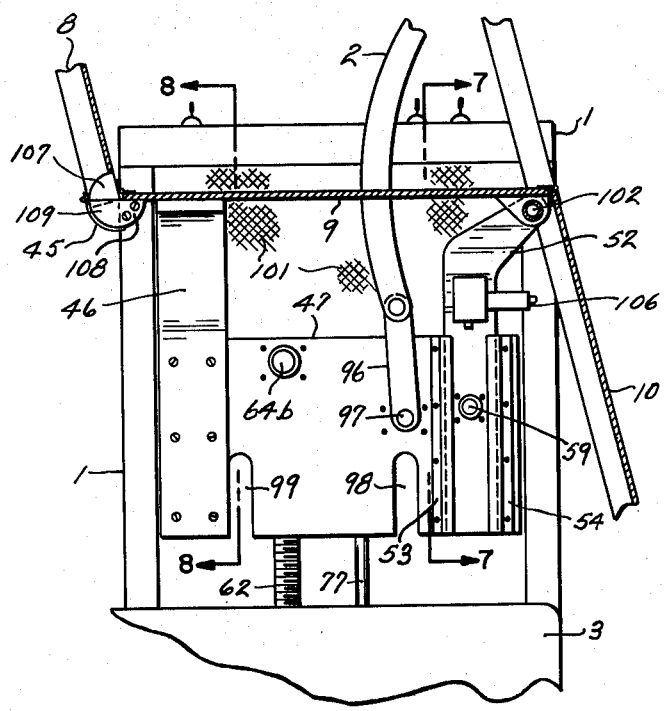
FIG. 6 is a fragmental sectional view, enlarged, taken on line 6—6 of FIG. 2 showing the adjustable height front pivot arm, and patient handler positioner crank.

FIG. 3 is a sectional view of the lift mechanism housing 1 taken on line 3—3 of FIG. 2. The vertical lift plate or carriage 47, controlled by motor 112 moves support arms 46 and 52 up or down at the same time and at the same rate. This plate 47 has four grooved ball bearing roller wheels 48, one at each corner of the plate. The grooved wheels 48 are attached to the plate by means of plate brackets 49 one for each wheel. The wheels 48 run on guide tracks 50 secured to frame 1 by appropriate bolts 51. The wheels 48 are on the same side of tracks 50 as the cantilever overhang of the patient hauler with respect to housing 1, so that the weight of the patient hauler presses wheels 48 against tracks 50. Rear stationary cantilevered support fork arm 46 is secured to the vertical carriage plate 47 with appropriate bolts as shown in FIGS. 6 and 8. The forward cantilevered pivot fork arm 52, to which the patient handler assembly, 8, 9, 10, is attached at 102 (see FIG. 6) is shown at the left in FIG. 3 on plate 47. Pivot fork arm 52 is mounted in ways 53 and 54 on the opposite side of plate 47, as seen in FIG. 3, and shown clearly in FIG. 6. A 24 volt aircraft-type gear motor 55 actuated by switch 39 operates the lead screw 56 rotating in bearing blocks 57 and 58 secured to plate 47, traversing nut 59 up or down. This provides a pressure-irreversible device for raising support arm 52. Lead screw nut 59 is secured to the pivot arm 52 through a slot in plate 47, not shown. This motor 55 controls vertical movement of arm 52 relative to arm 46.

All traverse movements of linkage 2, plate 47, and lead screw nut 59, are stopped at the extermities of their travel by limit switches. Limit switches 60 and 61, for example, of the travel of vertical plate 47 are shown on the right bottom and top of frame 1, FIG. 3. The lower switch 60 is tripped by the bottom of plate 47, while the upper switch 61 is tripped by stop 63a. Carriage plate 47 is operated up or down by lead screw 62 which transmits movement of floating nut 63, pivoted in clevis frame 64, at 64a, and attached to plate 47 by stub shaft 64b, rigid with 64 and at right angles to axis 64a, which oscillate in the pivot bearing 65 carried by plate 47, FIG. 5. The lead screw 62 is pinned to worm gear 66 which has an integral shaft mounted in ball bearings 68 and 69. The upper end of lead screw 62 is mounted in ball bearing 75 attached to a partition 78 of the frame 1. The worm gear 66 is turned by worm 67 which also has an integral stub shaft and similar ball bearing mounts, not shown. The worm and stub shaft 67 is coupled through coupling 114 to a 24 volt aircraft-type reversible D.C. drive motor 112, best seen in FIG. 9. An oiltight sealed housing 74 contains mating worm and worm gear assembly 67 and 66, respectively. The floating lead screw nut drive for plate 47 gives improved lift power and great efficiency.

Housing 74 also contains a similar set of worm and worm gear arrangements 71 and 70 mounted typically in ball bearings 72 and 73. Worm 71 is coupled through 115 to a separate identical motor 113, as seen in FIG. 9. The stub shaft of worm gear 70 is pinned to vertical shaft 77. Ball bearing 76, mounted on partition 78, holds the top of shaft 77. Referring to FIG. 4, it is seen that shaft 77 has a keyway milled its entire length from end to end such that the worm assembly 94, attached to plate 47, can slide up and down shaft 77. Key 81 is affixed to sleeve 80, mounted in bearings 90 and 91, and pinned to worm 79. As shaft 77 turns, worm 79 turns whether plate 47 is stationary or moving up and down. Worm 79 turns worm gear 95, FIG. 3, keyed to shaft 97 bearing mounted in plate 47. Shaft 97, in turn, rotates crank arm 96 which moves linkage 2 up or down. Crank arm 96 is clearly shown in FIG. 6. This provides a pressure-irreversible device for raising linkage 2.

Linkage arm 2 has previously been explained as the actuator which changes the position of the hinged three-sectional patient handler. Cutouts 98 and 99 in plate 47, FIG. 3, straddle the stub shafts of worms 71 and 67 respectively. This permits clearance so that plate 47 can travel downward to its minimum height at shut-off switch 60.

Note that the base housing 3 is closed at least on the top and sides. Also the vertical housing 1 is closed at least at the top and along the front and rear and outer sides. This provides safety and a clean-cut appearance. To hide the mechanism mounted in frame 1 on the inside at least above the level of seat 20, as well as for the sake of safety, and to prevent garments of the patient from being soiled, a plastic fabric curtain 101 is attached to the top of carriage plate 47. The slack of the fabric 101 is taken up as plate 47 moves upward by spring tension roller 100.

FIG. 6 shows the opposite side of FIG. 3. Cutoff switch 106, for the motor 113 driving crank 96, is affected as linkage arm 2, attached to linkage 10, pivots linkage 10 about cantilevered front pivot bar 102. As linkage 10, moving clockwise in FIG. 6, depresses switch 106 the chair position movement is stopped in its most upright position. As the chair is converted into a litter by the downward motion of linkage 2, the rear hinge stops 107 and 108 are protected by guard 45 and end plate 109. Referring to FIG. 8, on rear fixed cantilever fork arm 46 is mounted a shut off switch 110. As linkage 2 (FIG. 6) brings left chair arm 32 downward, making a litter of the patient handler sectional assembly, the left arm rest 32 operates switch 110, as shown in FIG. 8, cutting off the drive of motor 113 at the litter position of the patient handler.

FIG. 9 is a sectional view of the base showing motor 112, which effects the up and down travel of lead screw 62 (FIG. 3), and motor 113 which effects rotary motion of crank 96 (FIG. 3) through worm couplings 114 and 115 respectively. The three drive motors 112, 113 and 55 (FIG. 3) are supplied current by known electrical circuits, not shown, from rechargeable battery 140. Battery charger 139 is supplied from regular house current by way of slip rings and electrical cable wound on take-up reel 116 and connectable to current supply by way of receptacle 44. The electrical circuit is standard and not considered an important part of the invention.

The synchromesh brake applied to rear wheels 16 and 17 is operated by engagement of the directional tapered teeth of two gears 135 (FIG. 10) meshing with ring gear wheel hubs 136. Each gear 135 is held by three bushinged pins 134, which are kept from rotating by the stationary assembly with base housing 3. In or out motion of member 133 or 118, FIG. 9, causes the brake to be applied or released, respectively. Brake bar 43, when rotated clockwise by handle 41, FIG. 2, causes bars 118 and 113 to be forced outward by clevis and pin assembly 117. This utilizes brake bar linkages 120, 123, 128 and 131, operating about stationary pivot pins 121, 126 and 130, to transmit movement to the brake mechanisms of rear wheels 16 and 17. Link 125 is operatively connected with an over-center spring 137, loaded from spring stop 138. A 45° clockwise or counterclockwise movement of brake actuator rod 43 will by this means cause the synchromesh brakes to snap in or out of engagement simultaneously.

Figure 11:
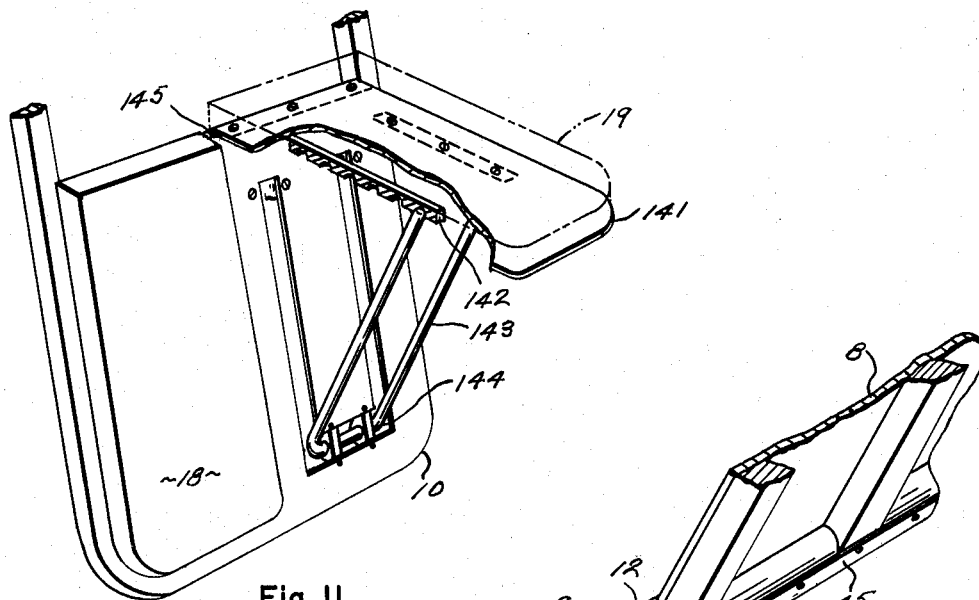
FIG. 11 is a perspective view of the leg support section of FIG. 1, showing the independent right and left leg supports with manual adjustment mechanism.

FIG. 11 shows the manually operated independent, right and left leg lift arrangement. Both leg systems are identical. A separate leg plate 141 is hinged at 145 at the knee height of the leg section member 10 of the hinged sectional patient handler. Support rods 144 prop each leg plate 141 with its padding 18 or 19 at desired selective angles by means of a notched bar support stop 142 secured to each leg plate 141.

Figure 12:
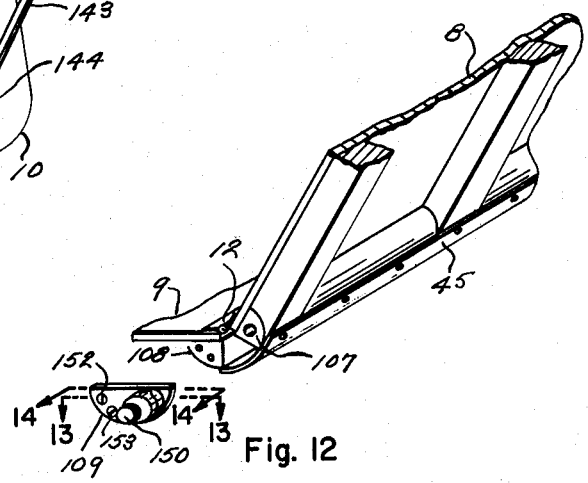
FIG. 12 is a fragmental perspective view, enlarged, of the back hinge of the chair as seen in FIG. 1, showing also an exploded view of the hinge locking plate at the lower left side.
Figure 14:
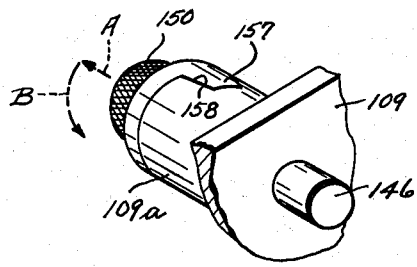
FIG. 14 is a perspective view, enlarged, taken on line 14—14 of FIG. 12 showing at 14(a) the closed, and at 14(b) open position of the hinge locking pin as it extends through the hinge guard plate.
Figure 13:
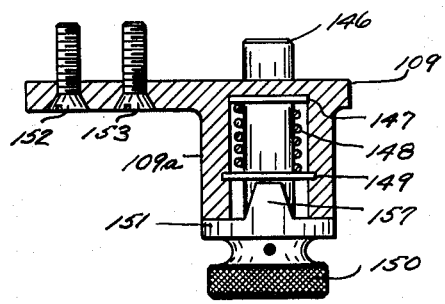
FIG. 13 is a sectional view, enlarged, taken on the line 13—13 of FIG. 12 showing the spring loaded hinge locking pin.
Figure 14:
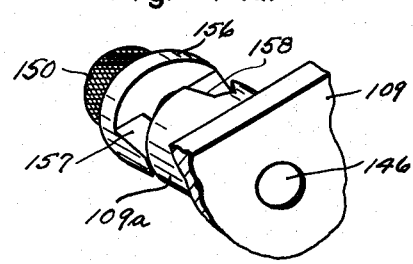

FIG. 12 shows the locking arrangement of the gear hinge 12 where the seat section is linked with the back section of the patient handler. Stop 107, rigid with back section 8, includes a hole receptacle into which pin 146, carried by plate 109 rigid with seat section 9, may be engaged to lock the rear hinge stops 107 and 108. When so locked, linkage 2, when raised, will rotate the litter assembly into an upright vertical position, FIG. 19. When pin 146 is disengaged, linkage 2, on raising will move the patient handler from a litter to a sitting position, FIG. 15. Referring to FIG. 13, pin 146 with integral shoulder 147 is assembled by inserting in end plate 109, backed up by spring 148. Snap ring 149 is then inserted in the plate to compress the spring, thus urging pin 146 into the recess or hole of 107. Adjustment knob 150 is then assembled to plunger 146 by means of pin 151. The two screws, 152 and 153, secure plate 109 to hinge stop cross member 108, which in turn is secured to seat section 9. Referring to FIGS. 14(a) and 14(b), integral with control knob 150 is a collar 156 having an inwardly extending locking projection 157. Integral with plate 109 is a sleeve 109a having an outwardly opening recess 158 adapted to receive projection 157. These parts are shown in locked position in FIG. 14(a) with pin 146 inserted in the hole in stop 107. Then pulling knob 150 in the direction of arrow A pulls pin 146 out of the hole and compresses spring 148. Then turning knob 150 in the direction of arrow B moves projection 159 away from recess 158 to hold pin 146 in unlocking position.

FIGS. 15, 16, 17, 18, 19 and 20 further help to show more clearly the many positions in which the patient handler can be automatically adjusted.

Figure 15:
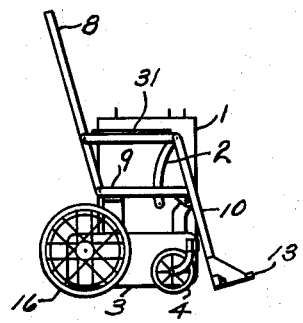
FIG. 15 is a side elevational view of the patient handler in its normal sitting or chair position.

FIG. 15 is a standard chair arrangement.

Figure 16:
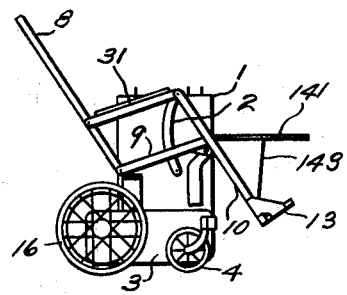
FIG. 16 is a side elevational view showing the chair position tilted back and the leg supports elevated.

FIG. 16 shows a tilted back chair arrangement in combination with a leg lift.

FIG. 17 shows a high litter which is cantilevered from casing 1 by the fork lift arrangement involving supports 46 and 52.

Figure 18:
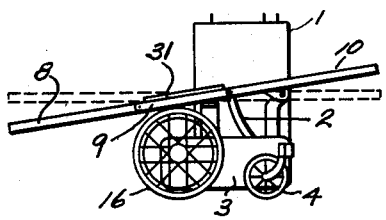
FIG. 18 is a side elevational view of the lowered litter position in full lines tilted back at an angle, and indicating by dotted lines the horizontal position.

FIG. 18 shows a low litter with oscillation through control of drive motor 55.

Figure 19:
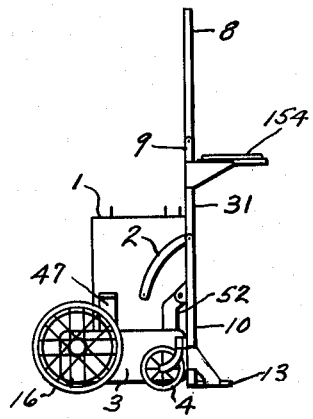
FIG. 19 is a side elevational view of the litter with arm rest accessories in place, the litter rotated about the front pivot arm, with back hinge locked, to effect a vertical position.

FIG. 19 shows the result of locking the rear seat hinge stops and pivoting the litter about pivot arm 52. Also shown in this view are accessory arm rests 154 attached when desired to aid and support the upright patient.

Figure 20:
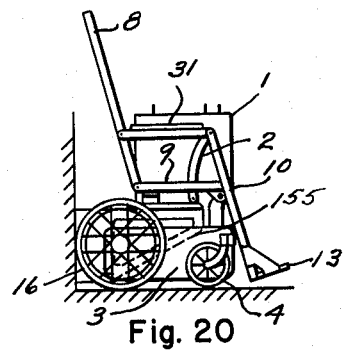

FIG. 20 depicts how the patient handler can be backed over a wall-hung-type commode 155, using the rearwardly opening recess in the base housing 3, which is clearly seen in FIGS. 2 and 9.

Figure 21:
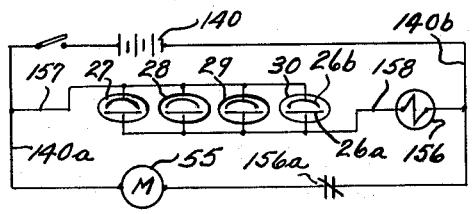
FIG. 21 is a wiring diagram showing how tape switches 26 stop the device when actuated.

FIG. 21 is an electrical diagram showing how the tape switches 27, 28, 29 and 30 of FIG. 1 may be connected to automatically stop a motor of the patient handler, such as motor 55, in case a portion of the patient's body is caught between one of the arms 31, 32 as the handler is moving say from a chair position toward a litter position. Referring to FIG. 1(c), it should be understood that the tape switch indicated at 26 in cross section, has a lower flat continuous conductor strip 26a and an upper conductor strip 26d which is convex upwardly. In the unstressed condition of the parts, as shown in FIG. 1(c), the only points of contact between the strips 26a and 26b are along their parallel lateral edges and at this point, they are held separated by insulator strips 26c. Therefore, the switch is normally open and contact is made only when the central portion of the strip 26b is pressed downwardly to contact the strip 26a. Referring to FIG. 21, the battery 140 supplies power lines 140a and 140b. A motor of the handler, such as the motor 55, has its armature in field connected across the power lines. In series with the armature of the motor is a relay armature 156a which is normally closed. Also connected across the power lines 140a and 140b by lines 157 and 158 is a relay 156 which controls the armature 156a. Connected in parallel between the lines 157 and 158 are the tape switches 27, 28, 29 and 30. The conductor strips 26a and 26b are shown diagrammatically in this view. It is thus obvious that if anything is caught in such a manner to depress anyone of the tape switches, the conductor strips 26a and 26b of that particular tape switch will be pushed into contact thus closing a circuit through lines 157 and 158 to energize the relay 156. This causes the relays 156a to open and stops the action of motor 55 until a correction is made.

What is claimed is:

1. A patient handler comprising a hollow base housing, wheel means operatively mounted on said housing for movement of the latter along a surface, wheel control mechanism in the hollow of said housing, a vertical housing rigidly fixed to said base housing and wholly to one side thereof, a lift carriage mounted for vertical movement in said vertical housing, a rear support arm having a fixed mounting on said carriage, a front support arm horizontally spaced from said rear support arm and vertically movably mounted relative to said carriage, a seat section mounted on said arms wholly on the base housing side of said vertical housing, a pivot connection between said front support arm and the forward portion of said seat section, a back section hingedly connected to the rear of said seat section, a leg section hingedly connected to the front of said seat section, means for moving said back and leg sections between a position coplanar with said seat section and positions angularly related to said seat section, means for simultaneously raising and lowering said support arms, and means for raising and lowering said front support arm independently of the position of said rear support arm, said base housing and wheel means being of a height to pass beneath a hospital bed, whereby said sections in coplanar relationship may pass in cantilever fashion over the upper surface of the bed.

2. A patient handler as defined in claim 1 wherein said means for moving said back and leg sections and said means for simultaneously raising and lowering said support arms and said means for independently raising and lowering said front support arm are housed entirely in said base housing and in said vertical housing.

3. A patient handler as defined in claim 2, wherein said base housing is substantially wholly closed on its top and sides, said vertical housing is substantially wholly closed on its top and front and rear and outer sides, and means is provided for closing the inner side of said vertical housing at least from its top down to the level of said seat section.

4. A patient handler comprising a frame, seat and back and leg sections, said back and leg sections hingedly connected to rear and front edges respectively of said seat section, side arms above and parallel to opposite side edges of said seat sections, said side arms and seat and back and leg sections pivotally connected for movement of said back and leg sections between a position coplanar with said seat section and positions angularly related to said seat section, whereby in said coplanar position said side arms lie closely adjacent said seat and back sections, electrical power means for moving said sections from said angularly related position to said coplanar position, and two tape switches, one on each side of said seat and back sections, secured to said seat and back sections to lie between said side arms and said seat and back sections in said coplanar position, said tape switches having longitudinally continuous contacts connected in series with said power means and so arranged as to be actuated to power-means-disabling position by pressure upon either of said tape switches being so actuated by any material caught between said side arms and said back and seat sections as they approach said coplanar position.

5. A patient handler as defined in claim 1, wherein said lift carriage comprises a generally vertically extending plate, parallel vertical guideways in said vertical housing, and friction reducing means mounting said plate for movement on said guideways.

6. A patient handler as defined in claim 5, wherein said means for simultaneously raising and lowering said support arms includes a lead screw parallel to said plate and mounted in said vertical housing for rotation about its longitudinal axis, a floating lead screw nut threaded on said screw, said nut pivotally mounted in a clevis frame for oscillation about a first axis, said clevis frame pivotally mounted in said plate for oscillation about a second axis at right angles to said first axis, and power means for rotating said lead screw.

7. A patient handler as defined in claim 5, wherein said means for raising said front support arm independently of the position of said rear support arm includes a lead screw parallel to said plate and mounted on said plate for rotation about its longitudinal axis, a lead screw nut threaded on said screw and fixed to said front support arm, and power means for rotating said lead screw.

8. A patient handler as defined in claim 5, wherein said means for moving said back and leg sections includes a shaft parallel to said plate and mounted in said vertical housing for rotation about its longitudinal axis, a bracket fixed to said plate, a worm rotatably mounted in said bracket and embracing said shaft, said worm having a connection for rotation with said shaft and for sliding movement longitudinally of said shaft, a shaft carried by said plate at right angles thereto, a worm gear rotatable on said shaft and meshing with said worm, a crank arm rotatable with said last named shaft, a link pivotally connected between said crank arm and a part connected with said back and leg sections, and power means for rotating said first named shaft.

9. A patient handler as defined in claim 5, wherein said friction reducing means comprises wheel means on said plate and engaging on the base housing side of said guideways, whereby the weight of said sections urges said wheel means toward said guideways.

10. A patient handler as defined in claim 5, including a protective curtain connected at one end to the top of said vertical housing and at its other end to said plate, spring-tensioned roller take-up means at one of said connections, and said curtain extending substantially the full width of said vertical housing.

11. A patient handler as defined in claim 1 wherein said means for raising and lowering said front support arm independently of the position of said rear support arm includes a pressure-irreversible device.

12. A patient handler as defined in claim 1 including means for locking said sections in said coplanar position to form a litter, and, with said sections so locked in a coplanar position, said means for moving said back and leg sections being effective for moving said litter to a position substantially vertical.

References Cited by the Examiner

UNITED STATES PATENTS

| | | | |
|---|---|---|---|
| 2,009,862 | 7/1935 | Spell | 188—31 |
| 2,172,941 | 9/1939 | Manning et al. | 269—325 |
| 2,587,068 | 2/1952 | Sanders | 5—81 |
| 2,672,917 | 3/1954 | Collura | 297—327 |
| 2,869,614 | 1/1959 | Wamsley | 5—86 X |
| 3,038,174 | 6/1962 | Brown et al. | 5—68 X |

FRANK B. SHERRY, *Primary Examiner.*

R. D. KRAUS, *Assistant Examiner.*